United States Patent
Jenkins, Jr.

(10) Patent No.: US 6,640,885 B2
(45) Date of Patent: Nov. 4, 2003

(54) THREE-LAYER CONDENSER

(75) Inventor: James H. Jenkins, Jr., South Amana, IA (US)

(73) Assignee: Maytag Corporation, Newton, IA (US)

( * ) Notice: Subject to any disclaimer, the term of this patent is extended or adjusted under 35 U.S.C. 154(b) by 165 days.

(21) Appl. No.: 09/899,723

(22) Filed: Jul. 5, 2001

(65) Prior Publication Data

US 2003/0006027 A1 Jan. 9, 2003

(51) Int. Cl.[7] ................................................. F28F 1/32
(52) U.S. Cl. ........................ 165/171; 165/150; 29/727
(58) Field of Search ............................ 165/171; 29/727

(56) References Cited

U.S. PATENT DOCUMENTS

| | | | |
|---|---|---|---|
| 520,930 A | 6/1894 | Levey et al. | |
| 754,522 A | 3/1904 | Vollmann | |
| 2,657,020 A | 10/1953 | Hofmeister | |
| 3,159,213 A | * 12/1964 | Wurtz | 165/171 |
| 4,073,045 A | 2/1978 | Margen et al. | |
| 4,153,195 A | * 5/1979 | Barozzi et al. | 228/183 |
| 4,619,024 A | * 10/1986 | McManus et al. | 29/890.048 |
| 4,901,791 A | 2/1990 | Kadle | |
| 5,197,539 A | 3/1993 | Hughes et al. | |
| 5,502,983 A | * 4/1996 | Dasher | 62/454 |
| 5,507,340 A | 4/1996 | Alston | |
| 5,669,261 A | * 9/1997 | Castren | 72/307 |

FOREIGN PATENT DOCUMENTS

JP          60002677 A    * 1/1985          C23C/26/00

* cited by examiner

*Primary Examiner*—Allen Flanigan
(74) *Attorney, Agent, or Firm*—McKee Voorhees & Sease, P.L.C.

(57) ABSTRACT

A condenser coil assembly is described and methods for forming such a device. The condenser assembly maximizes heat transfer surface area within a reduced volumetric area without significantly increasing the static pressure on the condenser fan system. The coil assembly is made up of a coil element through which refrigerant is transmitted and a plurality of wires that are affixed to the coil element to assist in dissipating heat from the coil element. The coil element is formed into a compact three-layer arrangement by first bending the coil element into a flat, zig-zag configuration. Secondly, the zig-zag shape is folded in a transverse direction to create three folds or flaps that are essentially equal in length. It is preferred that rounded bars be used to assist in creating the folds.

6 Claims, 2 Drawing Sheets

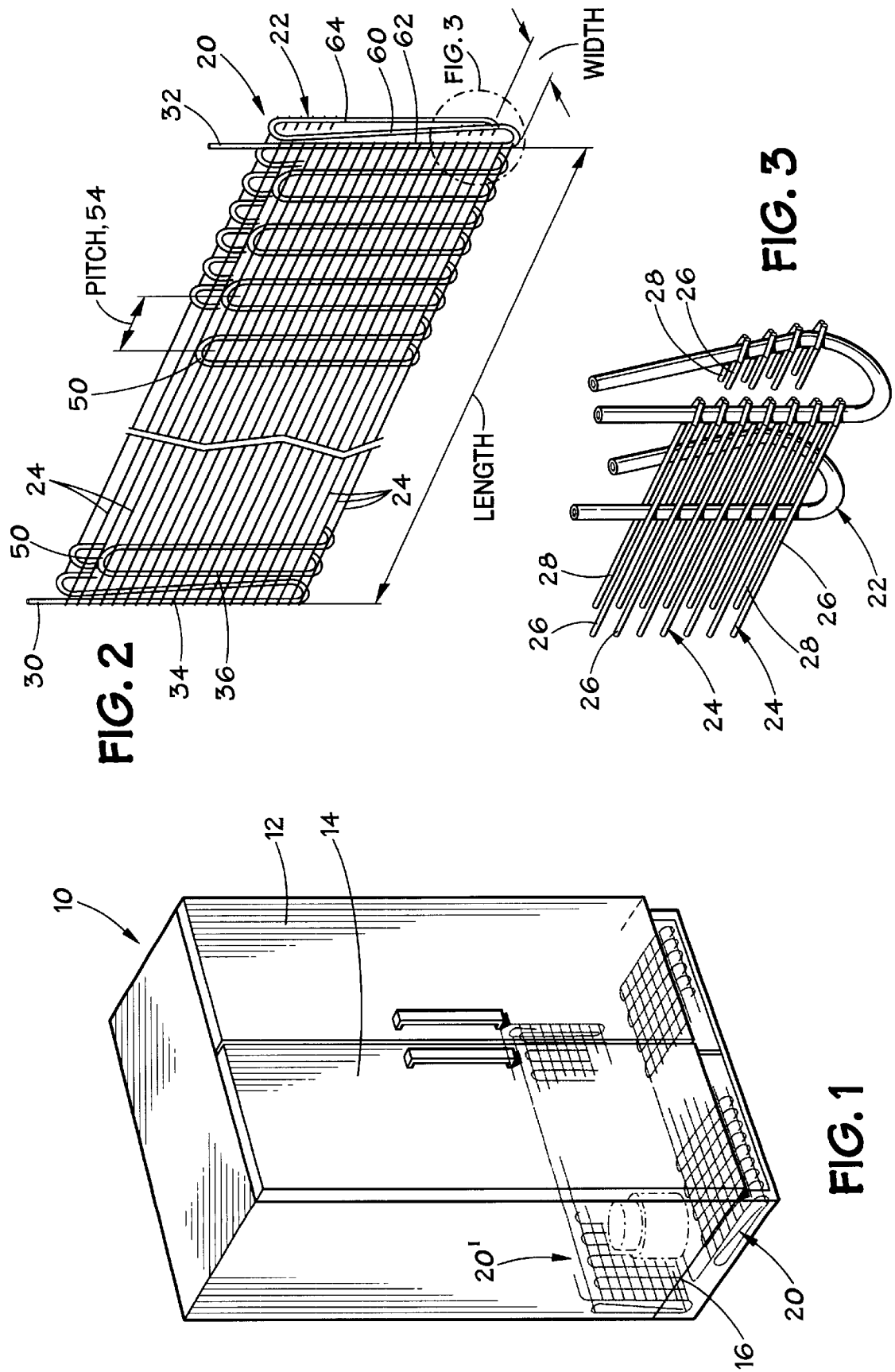

THREE-LAYER CONDENSER

BACKGROUND OF THE INVENTION

1. Field of the Invention

The invention relates generally to condenser coil assemblies for use in refrigerators and the like. In certain aspects, the invention also relates to methods for forming a condenser coil.

2. Description of the Related Art

Contemporary refrigerators use condensing coils to help remove heat from the refrigerant that is being used to cool the interior of the refrigerator. In the past, condensers were sometimes located along substantially the entire width and length of the back side of a refrigerator body for reasons of efficiency. This location was desired, and perhaps necessary, since a large amount of surface area is required for the condenser coil to effectively rid itself of heat without the benefit of air being forced through the coil.

Conventional condenser coils have been essentially flat arrays of sequential S-type or zig-zag curves. U.S. Pat. No. 520,930 entitled "Refrigerating Machine" and issued to Levey et al. depicts a typical flat coil winding wherein the refrigeration coil is essentially flat and bent so that the coil is wound in a zig-zag fashion in two dimensions. While this type of coil has proven itself to be efficient and effective at dissipating heat, it requires a significant amount of surface area for mounting. As a result, the condenser coil has most often been relegated to mounting upon the rear side of the refrigerator body and running substantially the entire length and width of the body.

Of late, it has become desirable to place the condenser coil assembly in the base pan of the refrigerator for aesthetic purposes and use a fan to force air through the coil assembly in order to cool it. This leaves the rear side of the refrigerator free. In addition, the inventor considers it desirable to minimize the amount of horizontal area, or footprint, that is taken up by the condenser coil assembly beneath the refrigerator in order to leave room for other components such as water valves and filters. The present invention addresses the problems associated with the prior art.

SUMMARY OF THE INVENTION

An improved condenser coil assembly is described as well as methods for forming such a device. The condenser assembly of the present invention maximizes heat transfer surface area within a reduced volumetric area without significantly increasing the static pressure on the condenser fan system. The coil assembly is made up of a coil element through which refrigerant is transmitted and a plurality of wires that are affixed to the coil element to assist in dissipating heat from the coil element. The coil element is formed into a compact three-layer arrangement by first bending the coil element into a flat, zig-zag configuration. Secondly, the zig-zag shape is folded in a transverse direction to create three folds or flaps that are essentially equal in length. It is preferred that rounded bars be used to assist in creating the folds.

BRIEF DESCRIPTION OF THE DRAWINGS

FIG. 1 is an isometric view of an exemplary refrigerator illustrating the location of a condenser coil assembly.

FIG. 2 is an isometric view of an exemplary condenser coil assembly constructed in accordance with the present invention.

FIG. 3 is a close up view of a portion of the condenser coil assembly shown in FIG. 2.

DETAILED DESCRIPTION OF THE PREFERRED EMBODIMENTS

FIG. 1 illustrates a refrigerator 10 of the side-by-side variety wherein a refrigerator compartment and a freezer compartment are located laterally next to one another. Doors 12, 14 provide access to each compartment. The lower end of the refrigerator 10 typically includes a lower pan or small storage space 16 that is used to retain a condenser coil assembly 20. Alternatively, the condenser coil may be retained at or upon the rear side of the refrigerator 10, as indicated by the alternative position 20' shown in FIG. 1.

Figure 4:
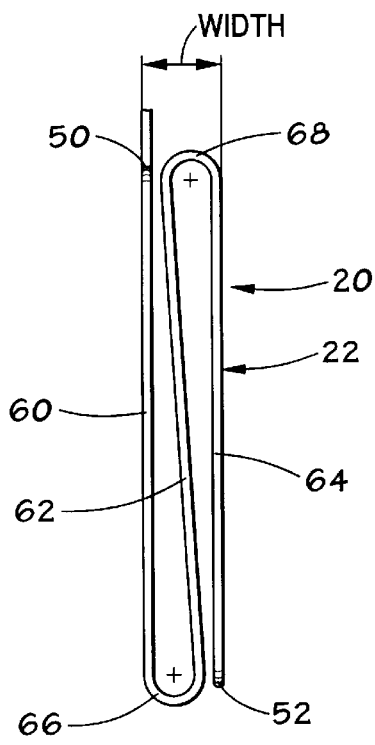
FIG. 4 is an end view of a condenser coil constructed in accordance with the present invention.

FIGS. 2, 3 and 4 illustrate an exemplary coil assembly 20 in greater detail. The coil assembly 20 includes a tubular coil element 22 and a plurality of heat-dissipating fins 24 that are affixed to the coil element 22, typically by welding and, most preferredly, electric resistance welding. FIG. 3 illustrates the attachment and configuration of individual fins 24. As can be seen there, each fin 24 is actually composed of a pair of elongated wires 26, 28 that lie opposite one another on each side of the coil element 22. The fact that two wires 26, 28 are used increases the amount of heat dissipation that is possible. It is noted that the fins 24 are attached at an orientation wherein they lie transverse to the run of the coil element 22. The ends of each pair of wires 26, 28 are joined to one another at each end of the coil assembly 20. The ribs 26, 28 are formed of a heat conductive metal such as steel and are designed to receive heat from within the coil element 22 and permit it to be dissipated as air flows through the coil assembly 20.

The coil element 22 is made up of a single, elongated and tubular fluid transmission tube 20 of a type known in the art. It is typically fashioned of a malleable metal such as copper-coated steel. There is a fluid inlet end 30 and a fluid outlet end 32 (see FIG. 2) that are each operationally affixed to other portions of the refrigeration system for the circulation of refrigerant. The general details concerning operation of the refrigeration system are well understood and, thus, will not be described in detail here.

Figure 5:
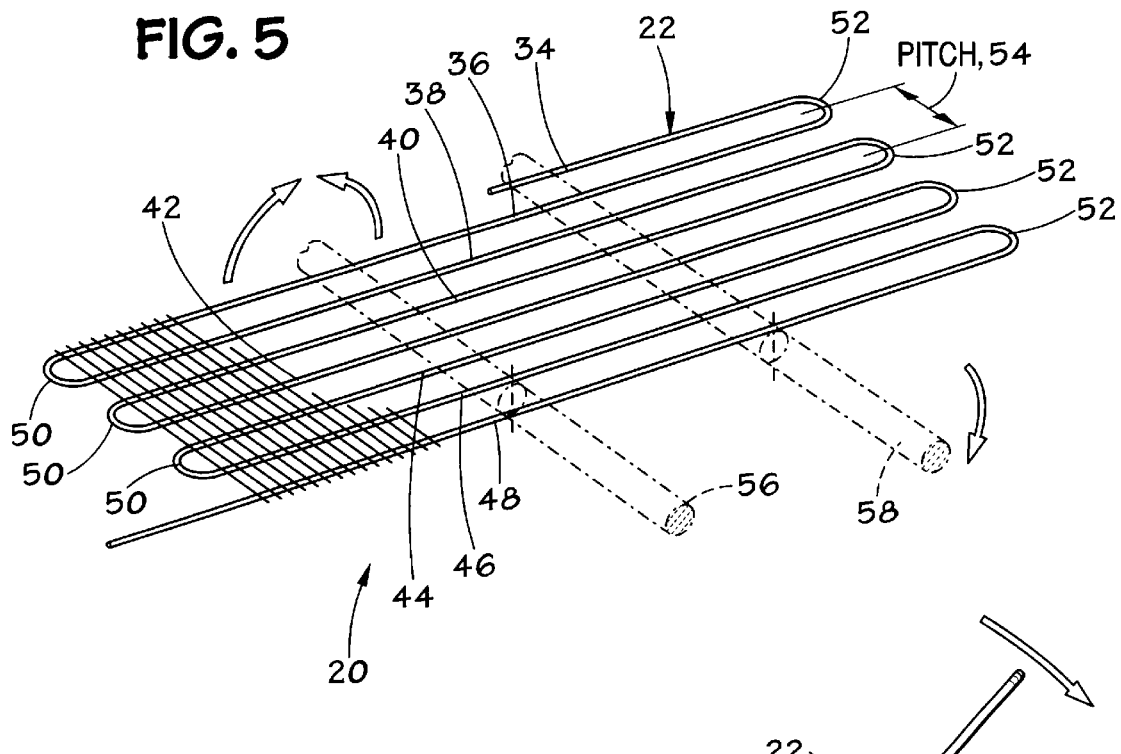
FIG. 5 illustrates an initial portion of a process for forming a condenser coil.
Figure 6:
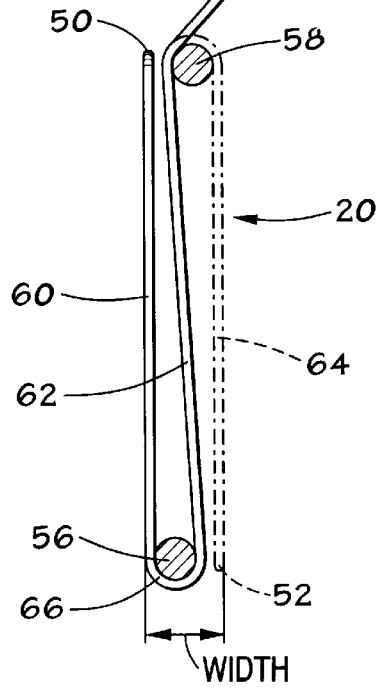
FIG. 6 is an end view illustrating a later portion of a process for forming a condenser coil.

The configuration of the coil element 22 is best understood by reference to FIGS. 5 and 6, which illustrate formative stages of the coil assembly 20 as well as FIG. 2, which depicts the coil assembly 20 in its final configuration. The coil element 22 is bent in a sequential manner so that it presents a plurality of straight run sections 34, 36, 38, 40, 42, 44, 46 and 48 (see FIG. 5) that are disposed in a parallel relation to one another and joined to one another by U-shaped bends 50 and 52 at either alternating end. The several sequential bends 50, 52 provide a relatively uniform distance, or pitch 54 (see FIG. 2) between each straight run 34, 36, 38, 40, 42, 44, 46 and 48. As a result, the coil element 22 is provided with a flat, two-dimensional zig-zag shape that is evident in FIG. 5.

After the zig-zag shape has been achieved, the coil element 22 is folded twice in a direction that is normal to the bends 50, 52. FIGS. 4, 5 and 6 best illustrate this folding wherein the ends of the flat array of bends and straight runs are folded so that end portions of the straight runs 34, 36, 38, 40, 42, 44, 46 and 48 become an additional layer that overlies central portions of those same straight runs. As can be seen from FIGS. 5 and 6, a pair of rods 56, 58 having a round cross-sectional shape are preferably used during the folding process. The rods 56, 58 are placed on either side of the coil element 22 and located so as to divide the coil element 22 roughly into thirds (see FIG. 5). The ends 50, 52 are then each bent in a clockwise direction, as FIG. 6 illustrates, about the rods 56, 58 to provide three layers 60, 62 and 64 that overlie one another for the coil element 22. The use of rods 56, 58 to help accomplish the folding results in rounded folds 66, 68 having a radius approximately equal to the radius of the rods 56, 58. As a result, the tubing of the coil element 22 is not bent beyond the critical radius necessary to enure that flow of fluid therethrough is obstructed. As can be seen from FIG. 6 the outermost layers 60, 64 are spaced apart from one another a distance less than four times the radius (or two times the diameter) of either rod 56,58.

It should be understood that the exemplary coil element 22, then, is first formed into a flat, X-Y array (according to a three dimensional coordinate system) of bends and straight run sections. Then the element 22 is bent into the Z-direction to form folds that result in the three layers.

In operation, the coil assembly 20 is effective in removing and dissipating heat from refrigerant carried through the coil element 22 and will do so while allowing the coil element 22 to provide a smaller footprint within the lower pan of the refrigerator 10.

While the invention has been described herein with respect to a preferred embodiment, it should be understood by those of skill in the art that it is not so limited. The invention is susceptible of various modifications and changes without departing from the scope of the claims.

What is claimed is:

1. A condenser coil assembly made according to the following method:
    taking an elongated condenser coil having a first coil end and a second coil end and being capable of carrying a refrigerant fluid from the first coil end to the second coil end;
    bending the condenser coil into an accordion shaped configuration comprising a plurality of first U-shaped bends, a plurality of second U-shaped bends and a plurality of approximately parallel straight run sections, each of the straight run sections extending between one of the first U-shaped bends and one of the second U-shaped bends, the accordion shaped configuration lying in a single X-Y plane;
    attaching a plurality of elongated first fins to the condenser coil on one side of the single X-Y plane and a plurality of elongated second fins on the side of the single X-Y plane, the elongated first and second fins both extending in a direction perpendicular to the straight run sections of the condenser coil;
    positioning an elongated first rod and an elongated second rod on opposite sides of the X-Y plane and extending parallel to one another and perpendicular to the straight run sections;
    making a first fold line by folding the X-Y plane in a first rotational direction about the first rod, the first rod having an outer curved surface of a radius sufficient to permit the refrigerant fluid to flow through the coil around the first fold line;
    making a second fold line by folding the X-Y plane in the same first rotational direction about the second rod, the second rod having an outer curved surface of a radius sufficient to permit the refrigerant fluid to flow though the coil around the second fold line, whereby the first and second fold line form the single X-Y plane into three overlying layers lying in separate planes; the outer most of said layers being spaced apart by a distance substantially less than four times said radius.

2. The condenser coil of claim 1 wherein each of the first and second wires has first and second opposite ends, each of the first ends of the first wires being joined to one of the first ends of the second wires and each of the second ends of the first wires being joined to one of the second ends of the second wires.

3. The condenser coil of claim 1 wherein the first and second fold lines divide the X-Y plane into thirds whereby the three overlying layers are of approximately the same size.

4. A method for making a condenser configuration comprising:
    taking an elongated condenser coil having a first coil end and a second coil end and being capable of carrying a refrigerant fluid from the first coil end to the second coil end;
    bending the condenser coil into an accordion shaped configuration comprising a plurality of first U-shaped bends, a plurality of second U-shaped bends and a plurality of approximately parallel straight run sections, each of the straight run sections extending between one of the first U-shaped bends and one of the second U-shaped bends, the accordion shaped configuration lying in a single X-Y plane;
    attaching a plurality of elongated first fins to the condenser coil one side of the single X-Y plane and a plurality of elongated second fins on the opposite side of the single X-Y plane, the elongated first and second fins both extending in a direction perpendicular to the straight run sections of the condenser coil;
    positioning an elongated first rod and an elongated second rod on opposite sides of the X-Y plane and extending parallel to one another and perpendicular to the straight run sections;
    making a first fold line by folding the X-Y plane in a first rotational direction about the first rod, the first rod having an outer curved surface of a radius sufficient to permit the refrigerant fluid to flow through the coil around the first fold line;
    making a second fold line by folding the X-Y plane in the same first rotational direction about the second rod, the second rod having an outer curved surface of a radius sufficient to permit the refrigerant fluid to flow through the coil around the second fold line, whereby the first and second fold lines form the single X-Y plane into three overlying layers lying in separate planes; the outermost of said three layers being spaced apart by a distance substantially less than four times said radius.

5. A method according to claim 4 and further comprising positioning the first and second rods so as to divide the X-Y plane into thirds, whereby the three overlying layers are of approximately the same size.

6. A method according to claim 4 wherein each of the first and second wires has first and second opposite ends, the method further comprising joining each of the first ends of the first wires to one of the first ends the second wires, and joining each of the second ends of the first wires to one of the second ends of the second wires.

* * * * *